June 11, 1968
M. H. GROVE ET AL
3,387,819
GATE VALVE BODY CONSTRUCTION INCLUDING REINFORCING MEMBERS
Filed Aug. 23, 1965
4 Sheets-Sheet 4
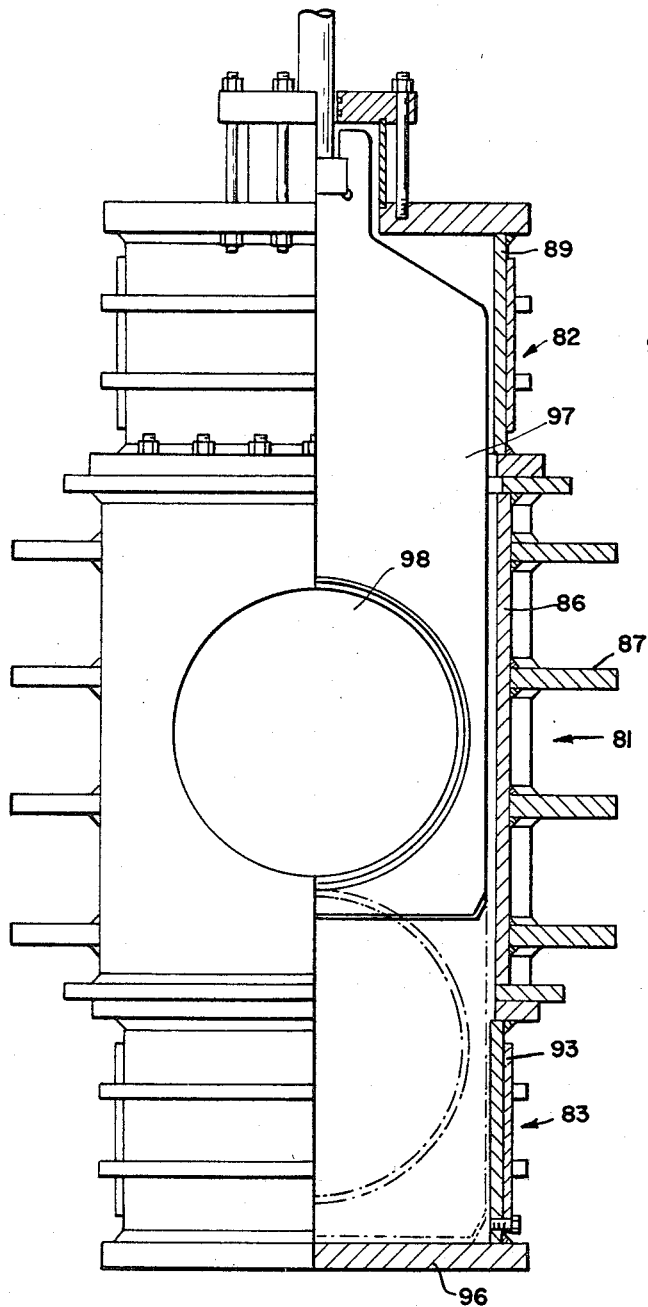
FIG_18
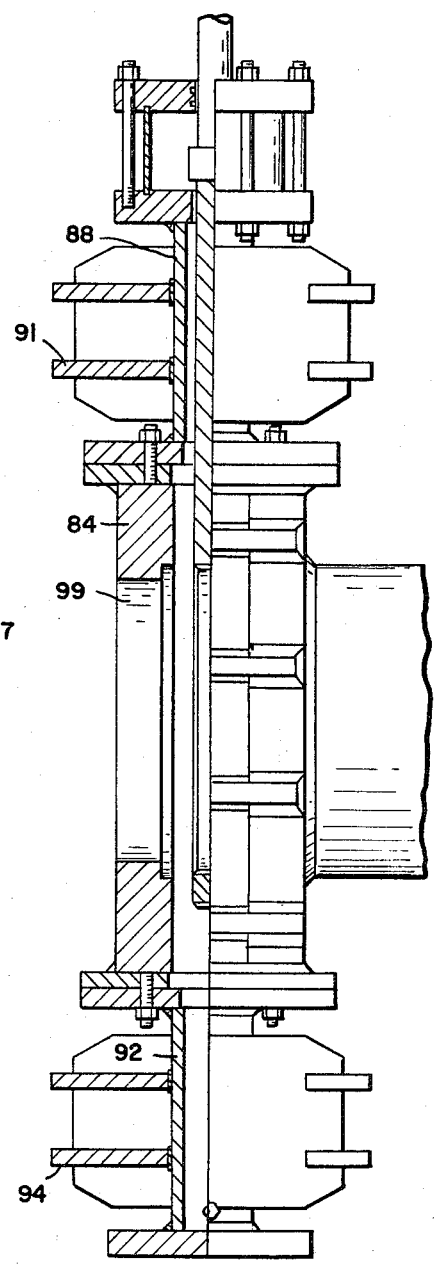
FIG_19
INVENTORS
MARVIN H. GROVE
KEE W. KIM
BY
ATTORNEYS United States Patent Office 3,387,819
Patented June 11, 1968

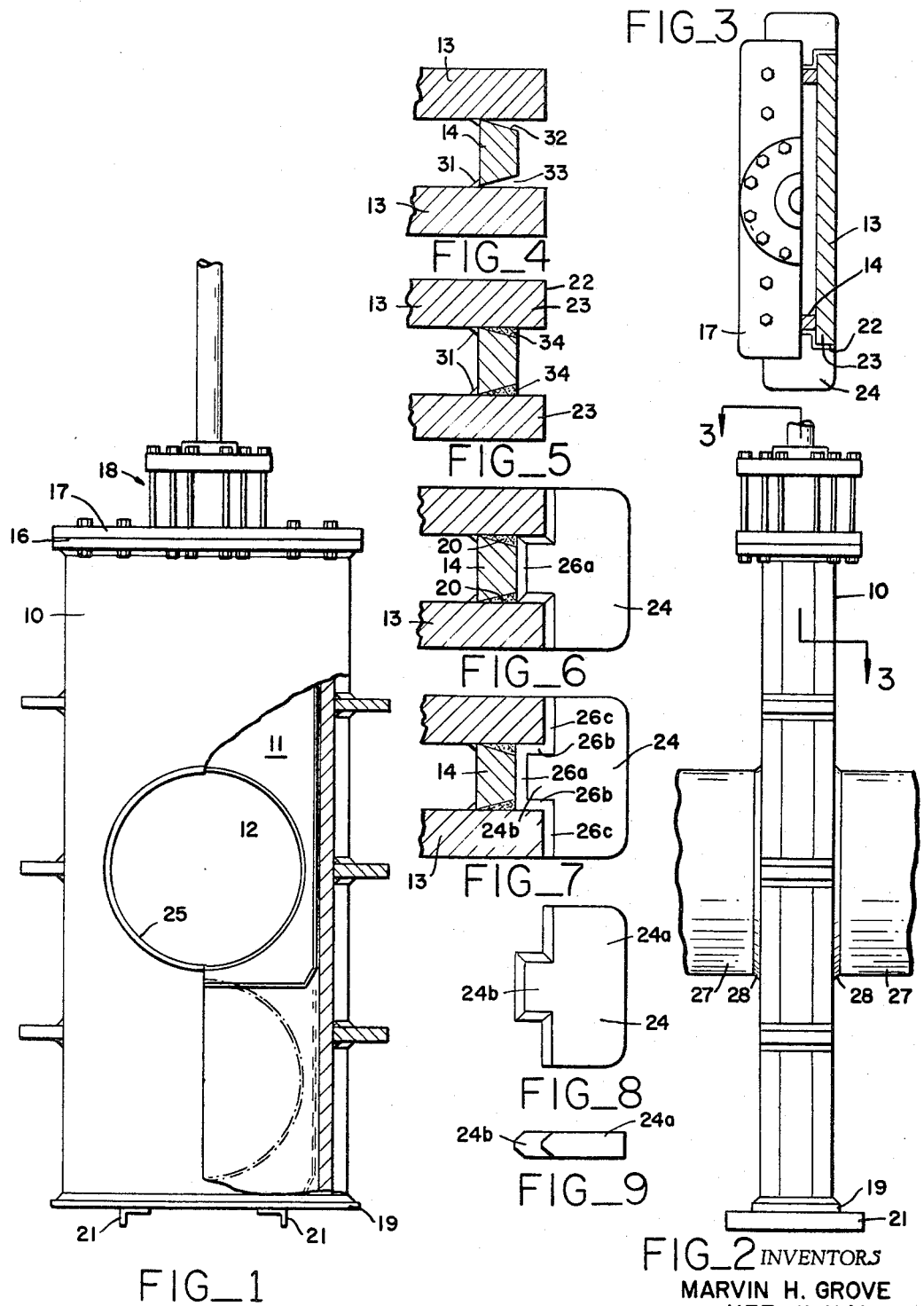

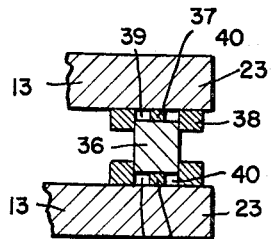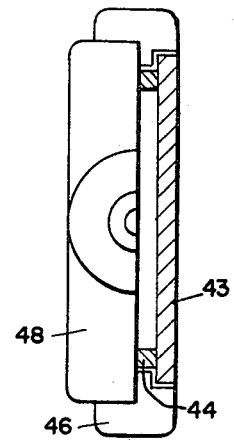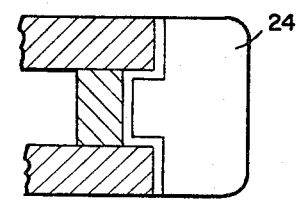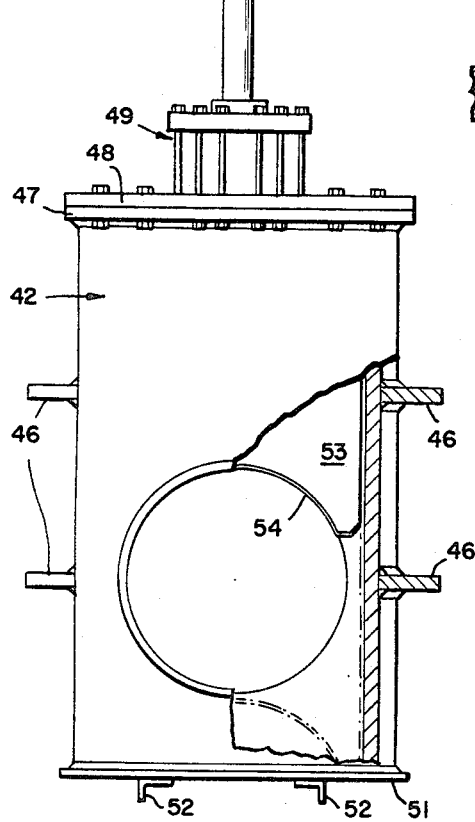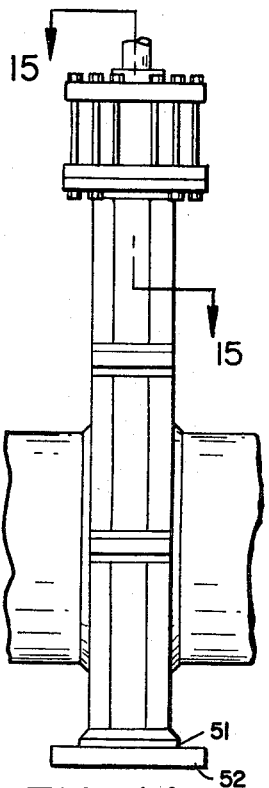

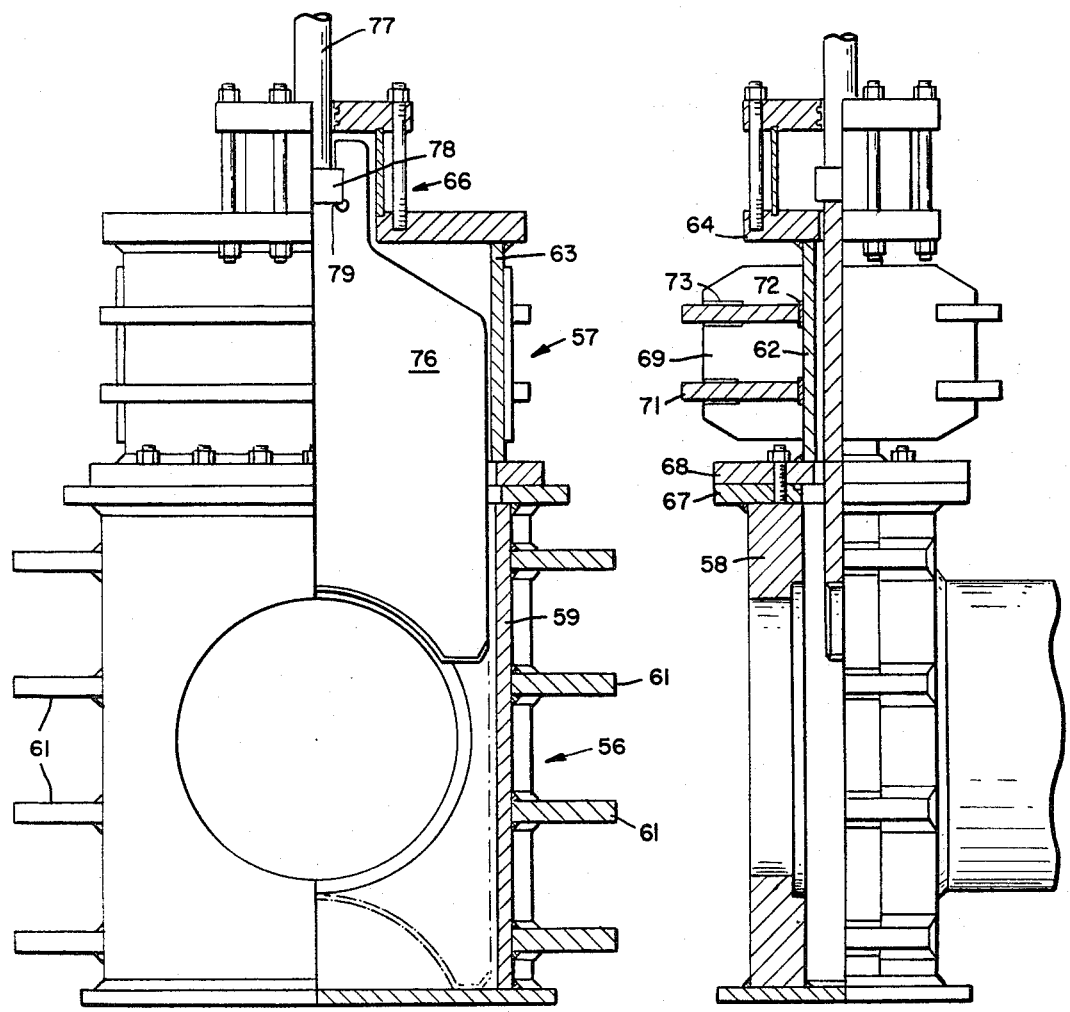
FIG_16  FIG_17
INVENTORS
MARVIN H. GROVE
KEE W. KIM
BY
ATTORNEYS

3,387,819
GATE VALVE BODY CONSTRUCTION INCLUDING REINFORCING MEMBERS
Marvin H. Grove, Piedmont, Calif., and Kee W. Kim, Houston, Tex., assignors, by mesne assignments, to M & J Valve Company, Houston, Tex., a corporation of Delaware
Continuation-in-part of application Ser. No. 453,377, May 5, 1965. This application Aug. 23, 1965, Ser. No. 481,661
4 Claims. (Cl. 251—329)

ABSTRACT OF THE DISCLOSURE

A gate valve body of the fabricated type having side welded-on ribs which reinforce the end walls against outward deflection, wherein the welded-on ribs have a portion extending between the margins of the end walls.

This application is a continuation in part of our copending application Ser. No. 453,377, filed May 5, 1965, for "Valve Construction." It relates generally to valves for controlling fluid flow and, more particularly, to valves having bodies made by fabrication methods.

In the construction of gate valves of the fabricated body type, it has been common to form the body section from structural steel shapes, e.g., plates, channels, angles, etc., that are welded together to form a body which is box-like or rectangular in section. That end of the body which is normally the bottom of the valve is closed by welding on one or more closure plates. The other extremity which normally forms the top of the valve is provided with a suitable bonnet assembly. The flat end walls of such a body are susceptible to outward deflection upon application of internal body pressure, and therefore, for the higher operating pressures it has been customary to reinforce the end walls as by the use of a plurality of welded-on stiffening ribs. The cost of manufacturing such valve bodies depends upon a number of factors including the weight of the metal employed, the welding time required, the amount of weld metal deposited, and the nature of the reinforcement provided. As previously stated, the reinforcement commonly used is in the form of ribs extending across the end walls of the body. Such reinforcing ribs not only greatly add to the weight of the body but, in addition, they require considerable welding and assembly time, particularly for valves of the higher pressure ratings.

In general, it is an object of the present invention to provide a fabricated gate valve construction which can be manufactured more economically than valves of the type described above.

Another object of the invention is to provide a gate valve of the fabricated body type which makes possible an effective saving in welding and assembly operation required, and in the number of ribs employed.

Another object of the invention is to provide a body construction which is relatively rigid and strong and which provides sufficient rigidity between the hubs without the use of additional tie members.

Addition objects and features of the invention will appear from the following description in which the preferred embodiments have been set forth in detail in conjunction with the accompanying drawing.

Referring to the drawing:
FIGURE 1 is an end view, partly in section, illustrating a valve of the fabricated type incorporating principles of the present invention;
FIGURE 2 is a side elevational view of the valve shown in FIGURE 1;
FIGURE 3 is a cross-sectional view taken along the line 3—3 of FIGURE 2, with the gate removed;
FIGURES 4, 5, 6 and 7 are cross-sectional details illustrating various stages in the fabrication of the body;
FIGURES 8 and 9 are plan and end views, respectively, showing one of the side ribs employed;
FIGURES 10, 11 and 12 are details in section, illustrating another procedure for fabrication of the body;
FIGURE 13 is an end view illustrating another embodiment of the invention;
FIGURE 14 is a side view showing the valve construction of FIGURE 13;
FIGURE 15 is a cross-sectional view taken along the line 15—15 of FIGURE 14;
FIGURE 16 is an end view partly in section, illustrating another embodiment of the invention;
FIGURE 17 is a side elevational view of the valve shown in FIGURE 16, partly in section; and
FIGURES 18 and 19 are side and end elevations respectively, partly in section, showing another embodiment of the invention.

The valve construction illlustrated in FIGURES 1 and 2 consists of a body 10 adapted to contain a valve member 11 of the gate type. In this particular instance, the valve gate 11 is provided with a port 12, which registers with flow passages in the end walls of the body for full open position of the valve. The main part of the valve body is formed from the end plates 13, which are rectangular as viewed in FIGURE 1 and which form end body walls, together with the members 14 which extend between the margins of the plates 13 and which form side body walls. All of these parts can be mill-rolled steel plate such as is commonly available on the market. The upper end of the body is provided with the welded-on flange 16 which serves to mount the bonnet plate 17. The operating rod for the valve (not shown) extends through the bonnet assembly 18 mounted upon the plate 17. The bottom end of the body is closed in some suitable manner, as by use of a closure plate 19 which is welded to the lower end of the plates 13 and members 14. Suitable supporting feet 21, which also act as reinforcing stiffeners, are shown attached to the plates 19.

Referring to FIGURE 3, the members 14 are attached to the adjacent portions of the plates 13 by relatively heavy weld connections 20 preferably formed in the manner to be presently described. It will be noted that the members 14 are parallel to and inset from the edges 22 of the plates, whereby the end plates have side extended margins 23.

Assuming that the body comprising the plates 13 and members 14 is not sufficiently rigid or strong to resist the pressures involved, we have provided the body with a plurality of reinforcing ribs 24. It will be noted that these ribs are distributed along the sides of the body rather than extended across the end walls formed by the plates 13. Each rib 24 before its application to the body may have a configuration substantially as shown in FIGURES 8 and 9. Thus, there is a main rib portion 24a and an extended tab-like rib portion 24b. FIGURES 3 and 7 show the manner in which these ribs are attached to the body. It will be noted that they are rigidly secured to both the margins of the plate and to the members 14 by the weld connections 26a, 26b and 26c.

The number and disposition of the ribs 24 may vary in accordance with requirements. As illustrated in FIGURE 1, three such ribs are provided on each side of the body. The plates 13 are provided with circular lined openings 25 forming flow passages. One pair of ribs 24 is disposed diametrically on opposite sides of the openings 12, and the others are disposed on opposite sides of the body extensions above and below openings 12.

The openings 25 are shown fitted with the pipe sections 27, and weld connections 28 are provided between the pipe sections and the end plates. The interior of the body is also fitted with suitable sealing assemblies (not shown) for making sealing contact with the side working surfaces of the gate. The sealing assemblies employed may vary in different instances, but may be located within machined recesses formed in the plates 13 (see French Patent No. 1,366,389).

The body construction described above is capable of withstanding relatively high internal pressures without the use of reinforcing ribs extending across the exterior faces of the end plates 13. Referring to FIGURE 7, it will be evident that without the ribs 24 there is a tendency for the plates 13 to rotate about the end portions of the members 14, when the plates 13 are deflected outwardly by internal pressure. However, with the ribs 24 applied in the manner described, the portions 24b of the ribs are placed in compression when forces are applied to the plates 13 tending to deflect them outwardly, and thus providing a rigid structure which is reinforced against such outward deflection. Connections 26a and 26c also serve to impart rigidity, thus aiding in strengthening the assembly and in general providing the desired reinforcement.

In addition to the reinforcement provided by the ribs, the upper and lower ends of the body are stiffened and reinforced by the welded-on flange 16 and bottom closure 13 and members 21.

No reference has been made in the foregoing description to prestressing certain portions of the body. We have found that it is possible to apply prestressing in connection with the welding employed, and that such prestressing serves to provide a final body capable of withstanding relatively high internal pressures. One such welding procedure can be described by reference to FIGURES 4–7. Members 14 are first positioned between the plates 13 in the manner shown in FIGURE 4, and light internal welds 31 applied. The edges of the members 14 are beveled as indicated at 32 to form relatively large V-notches 33 for receiving weld metal. The next step is to apply the external weld metal 20 to completely fill the V-notches as shown in FIGURE 5. This can be done by various conventional machine-welding methods, such as submerged arc welding using a vitreous granular flux. A number of passes are used in applying the weld metal, with the result that stresses are progressively applied between members 14 and plates 13, tending to pull inwardly upon the plate margins 23 and also tending to deflect the medial portions of the plates 13 in opposite directions, or outwardly.

Assuming, that the body is fabricated to the extent shown in FIGURE 5 without the application of ribs 24, then, when internal pressure is applied, the prestressing is first relieved and for higher pressures stresses are applied in opposite directions. Thus, prestressing aids in enabling the body to withstand relatively high internal pressures.

Assuming that a number of the ribs 24 are applied, the procedure can be as shown in FIGURES 6 and 7, to afford a greater amount of prestress. As illustrated in FIGURE 6, the weld connection 26a is first applied. Thereafter, the weld connections 26b are applied and their shrinkage serves to apply stress in tension to the tab portion 24b. Thereafter, the weld connections 26c are applied. The completed body now has prestressing by virtue of the manner in which the weld metal 34 is applied, and further prestressing by virtue of the tension applied to the portion 24b. Here again, when internal pressure is applied, the prestressing applied in the manner just described is first relieved and thereafter stressing is in opposite directions.

FIGURES 10, 11 and 12 illustrate another method whereby weld connections may be formed between the parts of the body by slag welding to provide prestressing. In this instance, the side members 36, corresponding to the members 14 of FIGURE 4, are positioned and clamped between the margins of the plates 13 in conjunction with the spacer bars 37. In preparation for slag welding, metal backing bars 38 are positioned as illustrated and held in place by suitable clamping means. Slag welding is now carried out in each of the four vertical cavities, thus producing a welded connection substantially as shown in FIGURE 11. In applying the slag welding, the inner cavities 39 are first supplied with weld metal, and thereafter, the cavities 40 are supplied. These welding operations may be carried out as distinctly separate operations or, they may be carried out simultaneously, with the weld metal supplied to cavities 39 in advance of the supplying of weld metals to the cavities 40. Application of weld metal in the manner just described causes solidification and shrinkage of the weld metal in cavities 40 somewhat later in time than the solidification and shrinkage of weld metal in cavities 39, thus applying stresses to the plates 13 in the same manner as previously described in connection with FIGURES 4–7 inclusive. In other words, the stress applied tends to pull the margins 23 together and to deflect the intermediate portions of plates 13 outwardly. FIGURE 12 shows the welded assembly of FIGURE 11 after a rib 24 has been applied. The ribs can be applied in the same manner as previously described to provide further prestressing.

The embodiment illustrated in FIGURES 13, 14 and 15 is quite similar to that of FIGURES 1–3 inclusive; however, in this instance the gate is relatively shorter and is not of the through-port type. More specifically, the body 42 in this instance is formed from the end plates 43 and the side members 44. The side members 44 are similarly attached by welding to the end plates 43 and to the reinforcing ribs 46. The upper end of the body is provided with a flange 47 which serves to mount the bonnet plate 48 and the bonnet assembly 49.

The lower end of the body is provided with the end closure 51 and the supporting feet 52. The gate 53 in this instance has its lower portion provided with an arcuate configuration as indicated at 54.

In general, the body construction of FIGURES 13–15 utilizes the same principles as the body construction of FIGURES 1–3 inclusive. However, the body is relatively shorter and therefore fewer reinforcing ribs 46 are required.

The embodiment of FIGURES 16 and 17 differs from the other described embodiments in that the main section of the body is constructed in the manner previously described, and is provided with a bolted-on body extension. Thus, the main part of the body 56 in this instance is provided with the bolted-on extension 57 which serves to accommodate the gate in raised or open position. The main part of the body is formed in the manner previously described, and can consist of the end plates 58 having their margins secured by welding to the side members 59. The side ribs 61 are provided in the same manner as the previously described ribs 24 and 46.

The body extension 57 is fabricated from relatively lighter structural metal parts. Thus, it is shown formed from the end plates 62 which have their side edges attached by welding to the side members 63. The top of the body extension is provided with a welded-on flange 64 which serves to mount the bonnet assembly 66. The top of the main body section 66 is provided with a welded-on flange 67 which serves to mount a flange 68 that is welded to the lower end of the body extension.

Because of the lighter metal used for the construction of the body extension, it is provided with reinforcing ribs. Thus plates 69 are attached to the sides of the body extension and they are slotted to accommodate the side extremities of the reinforcing ribs 71. These ribs have inserts 72 of non-metallic material between their inner edges and the end walls 62, and have weld connections 73 to the side plates 69.

The gate 76, shown in FIGURES 16 and 17, is likewise of the short type comparable to the gate 53 of FIGURE 13. It is shown attached to the operating rod 77 by the nut 78, which loosely engages within the keyhole-shaped opening 79.

In the embodiment of FIGURES 18 and 19 the central body section 81 is made similar to the body section 56 of FIGURES 16 and 17 but is provided with full upper and lower body extensions 82 and 83. The central section 81 includes the heavy plate-like end walls 84 together with the side walls 86. Also it is provided with ribs 87 applied in the same manner as the side ribs previously described. The upper body extension 82 can be made like the extension 57 of FIGURE 16. In other words, it consists of a main body part comprising the end walls 88 and side walls 89 together with the end reinforcing ribs 91. The lower body extension 83 likewise consists of a main body part comprising end and side walls 92 and 93 and the reinforcing ribs 94. The lower end of the body extension 83 is shown closed by the plate 96. Both the upper and lower extensions are clamped to the upper and lower ends of the central body section 81 in the same manner as described in FIGURES 16 and 17.

The gate 97 of FIGURES 18 and 19 is of the throughport type, being provided with a port 98 which registers with the flow passages 99 for open position of the valve.

A valve of the type shown in FIGURES 18 and 19 is particularly desirable for the larger pipe sizes.

We claim:

1. In a valve body construction, metal plates disposed in spaced parallel relationship and forming end body walls having aligned openings, metal members extending between the side portions of the plates and forming side body walls, said members having weld connections to the adjacent portions of the plate, and metal reinforcing ribs including strut-like portions extending between the side edge margins of said plates and secured thereto by welding, said strut-like portions being placed in compression when the metal plates are deflected in opposite outward directions by internal pressure.

2. In a gate valve body construction, metal plates disposed in spaced parallel relationship and forming end body walls, the end walls having openings forming aligned flow passages, metal members extending between the side portions of the plates forming side body walls, said last named members having weld connections with the adjacent portions of the plates and having a width as measured between the inner surfaces of the plates that is a minor fraction of the distance between the sides of the body, said members being inset from the side edges of the plates thereby providing side plate margins that extend beyond the outer surfaces of said members, said plates being subject to outward deflection when subjected to internal fluid pressure, and metal reinforcing ribs each including a tab-like portion interposed directly between the said margins and at right angles to the same, the tab-like portion having weld connections with said margins, said ribs serving to reinforce the plates against outward deflection.

3. A valve body construction as in claim 2 in which said ribs also have portions extending across the side edges of the plates and welded thereto, the first named tab-like portion of each rib also having weld connections with the adjacent side member.

4. In a valve body construction, heavy rectangular metal plates disposed in spaced parallel relationship and forming end body walls, metal members extending between the side portions of the plates and forming side body walls and having a width as measured between the inner surfaces of the plates that is a minor fraction of the distance between the sides of the body, said members having weld connections with the adjacent portions of the plates and being inset from the side edges of the plates thereby providing side plate margins that extend beyond the outer side surfaces of said members, and metal reinforcing ribs extending outwardly from the side edges of the plates, each of said ribs having a tab-like portion extending between the corresponding side margins of the plates, each rib having weld connections to the adjacent edge portions of the plates and also between the tab portions of the same and said members and the adjacent opposed surfaces of the side margins, the length of each rib as measured in a direction at right angles to the plates being substantially equal to the distance between the outer surfaces of the plates.

References Cited
UNITED STATES PATENTS

| | | | |
|---|---|---|---|
| 2,265,175 | 12/1941 | Kinzie et al. | 251—327 X |
| 3,204,929 | 9/1965 | Bryant | 251—329 |
| 3,265,354 | 9/1966 | Anderson | 251—329 |

A. ROSENTHAL, *Primary Examiner.*

M. CARY NELSON, *Examiner.*